Figure 1:
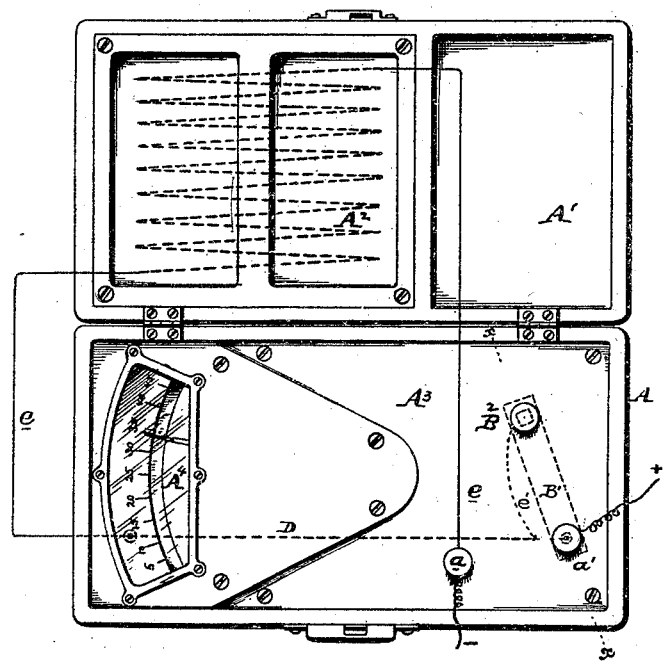

(No Model.)

E. G. WILLYOUNG.
ELECTRICAL MEASURING INSTRUMENT.

No. 491,457. Patented Feb. 7, 1893.

WITNESSES:

INVENTOR:
Elmer G. Willyoung
By his atty.

THE NORRIS PETERS CO., PHOTO-LITHO., WASHINGTON, D. C.

UNITED STATES PATENT OFFICE.

ELMER G. WILLYOUNG, OF PHILADELPHIA, PENNSYLVANIA, ASSIGNOR TO SAMUEL L. FOX AND EDWARD B. FOX, OF SAME PLACE.

ELECTRICAL MEASURING-INSTRUMENT.

SPECIFICATION forming part of Letters Patent No. 491,457, dated February 7, 1893.

Application filed August 11, 1892. Serial No. 442,767. (No model.)

*To all whom it may concern:*

Be it known that I, ELMER G. WILLYOUNG, of the city and county of Philadelphia, and State of Pennsylvania, have invented an Improvement in Measuring-Instruments for Measuring Electric Currents, of which the following is a specification.

My invention has reference to meters or measuring instruments for measuring electric currents, and consists of certain improvements which are fully set forth in the following specification and are shown in the accompanying drawings which form a part thereof.

Heretofore instruments have been made for measuring the voltage of electric currents in which advantage has been taken of the expansion of a wire by the heat developed therein by the passage of a current through the said wire as a resistance. The wire by expansion has been made to operate a pointer to indicate upon a dial the extent of expansion and consequently the current passing through it, be it alternating or continuous. Furthermore, such measuring instruments have been made so that the support for the wire has the same coefficient of expansion as the wire, whereby the support and wire both expand or contract in length to equal extents under atmospheric changes, and the pointer remains at zero. In this manner the change in length of the wire under ordinary atmospheric changes or differences of temperature in different rooms has been compensated for. Such instruments are well known as Cardew volt meters.

My invention has reference to measuring instruments of the above class and constructed for measuring volts or ampères.

My improvement will be fully understood from the description of the drawings, but before referring to the construction in detail, I will point out some of the important features of my invention.

My meter is so constructed that it has great portability and compactness, and is excellently adapted for laboratory use. The wire, compensating support, needle pivot, and, if desired, the dial plate, are all supported from a frame having essentially but one place of support upon the wooden or hard rubber frame of the box, thus obviating all defects which would arise from expansion or contraction, warping, or splitting of the wood or hard rubber. The needle or pointer is supported in pivot bearings and is made dead beat by the employment of a piston and air cylinder, so that the needle or pointer will not swing or pass beyond the proper point of deflection, but will be caused to move steadily and positively to the position of proper indication under all conditions of use. The expansion wire is stretched between supports, and connected at its middle transversely to the pointer and a spring which is adapted to operate the pointer when the tension of the wire relaxes under the application of heat generated in it by the passage of the current.

The various working parts of the instrument are secured to a removable part of the box, and contacts are so arranged upon the box and movable portions thereof that the instrument is readily assembled. The resistances, which are coupled in series or shunt, as the case may be, are placed in the cover of the box, while the testing or meter mechanism proper is located in the body of the box, whereby when the box is opened and in use the heat of the dead resistances will not affect the proper expansion of the wire operating the pointer. In instruments of this class, it is most desirable to remove all parts liable to abnormally change the expansion of the wire, as far from it as possible. These are some of the most important features of my improvements.

Figure 2:
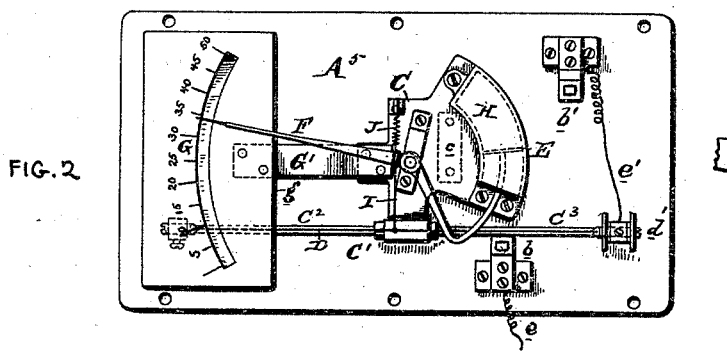
Figure 5:
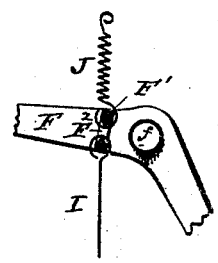
Figure 3:
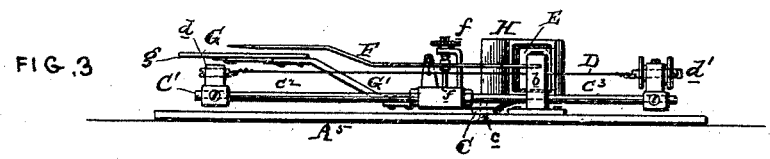
Figure 4:
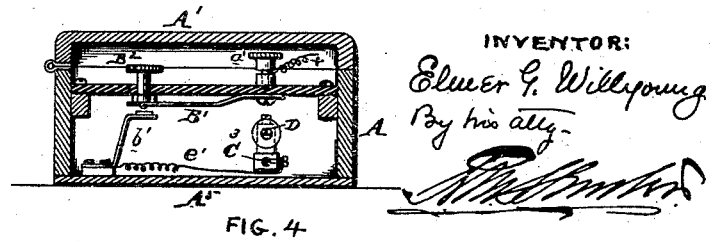

Referring to the accompanying drawings: Figure 1 is a plan view of my improved meter open; Fig. 2 is a plan view of the operating parts of the meter removed from the box; Fig. 3 is a side view of the same; Fig. 4 is a cross section on line $x-x$ of the box through the push button and its binding post; and Fig. 5 is a sectional plan view of a portion of the pointer to show the knife edges.

A is the case or box, and has a cover A' containing the dead resistances $A^2$ indicated in dotted lines. This box has the two binding posts $a\ a'$, one of which terminates under the hard rubber face $A^3$ in a contact, and the other in a spring circuit closing arm B' operated by a push button B². The face of the box also has a glass covered opening A⁴ through which the pointer and dial may be seen. The bottom of the box A⁵ is removable, and upon it is supported the operative parts of the instrument. The terminals of these parts are formed of contacts b b', respectively adapted to be brought into operative position with the contacts of the binding posts a and a' when the instrument has been assembled. The contacts of the binding post a and contact b are made to come into and maintain normal contact, but contacts B' and b' are only brought to proper relative positions so that the push button may be operated to bring them into contact to cause the current to traverse the expansion wire.

Secured to the bottom board A⁵, which may be of wood or hard rubber, is a metal frame C which has preferably but one piece of support or connection as at c. This frame C carries the wire support which consists preferably of two rods of metal of different coefficients of expansion, such as iron and brass, though this is not essential. This compensating support C' consists then of the iron rod C² extending in one direction from the frame C, and a rod of brass C³ extending in the other direction. This compound rod support for the wire has the proper coefficient of expansion for the preferred metal alloy used in the expansion wire, which is composed of platinum silver, german silver, platinoid, or any other high resistance alloy having a high coefficient of expansion for temperature. It is evident that the support C' might be all of one metal, that is, of the metal of the wire, or one having the same coefficient of expansion; or it may be made in any suitable manner by a combination of metals to give the proper coefficient of expansion.

D is the expansion wire through which the electric current passes. This wire may be made of any suitable metal and is of high resistance. It is preferably made of a compound metal composed of platinum and silver, and its coefficient of expansion is that which governs or dictates what coefficient of expansion the support for the wire shall have. One end of the wire D is secured electrically to one end of the support as at d, while the other end of the wire is secured to an adjustable screw d' insulated from the support but carried thereby at its other end. This screw d' permits adjustment so as to enable the requisite tension to be put upon the wire and also to regulate the distance between its supports d and d'. The frame C is connected electrically with the contact a through the resistance A² inclosed in the cover A' by the flexible conductors e which extend from the box to the cover and permit the latter to be opened or closed. The wires e e would in practice be brought up through the face A³ and directly to the resistance. For convenience they have been shown so as to indicate the circuits alone. They would be formed of flexible conductors where they are required to bend. The screw d' or end of the wire D connecting with it is electrically connected with the terminal a'. by the circuit e' and spring contact B'.

The frame C carries bearings f in which is pivoted the pointer F of aluminum. The free end of the pointer traverses a scale G upon a plate g, which may be secured to the back A⁵ of the box or to the frame C by an arm G' so that the warping, bending, or splitting of the wood or material of the back shall not displace the scale relatively to the pointer bearings. The method of supporting the wire, compensating supports therefor, and pointer bearings all from the same frame and thus securing them to the box frame at one place of small area only, prevents any relative distortion or displacement of any of these parts, and consequently makes the instrument exceptionally accurate and well adapted for laboratory and testing purposes generally. The pointer F has its rear provided with a piston E of aluminum, which fits within, but does not touch the walls of a stationary curved cylinder or chamber H closed at one end. This construction makes the pointer move with a dead beat action, that is, its movements are positive, and useless swinging is obviated. This will enable the instrument to be quickly read as no time is lost in letting the pointer come to rest. The cylinder or chamber H is secured to or formed integral with the frame C so that it too is required to remain in proper relative position to the pointer bearings. The pointer near its pivots is provided with a lug F' having a hole formed with knife edges F². A wire I rests against one of these knife edges and is secured to the expansion wire D at or near its middle. A spring J connects with the knife edge F² of the pointer and also with a support carried in the frame C or an extension thereof. The spring J pulls the pointer over the scale when the wire D is heated and expands; and when the wire D cools, its tension opposes the tension of the spring and returns the pointer to the zero point on the scale or dial. By making the supports for the wire D with the same coefficient of expansion as that of the wire D, the points may be always maintained at zero for all temperature variations which affect both the wire D and its support, and so that all readings during the passage of current shall be correct even though great variations in the surrounding temperature take place.

I do not limit myself to the minor details as it is evident that they may be varied without departing from the essential features of the invention.

Having now described my invention, what I claim as new and desire to secure by Letters Patent, is:—

1. In a measuring instrument for measuring electrical currents, the combination of a case or support, a dial, a frame for the expansive wire and bearings for the pointer supported from the case at a place of small area, an expansion wire and a pointer sustained thereby, and a connection between the pointer and expansion wire, whereby warping, bending, or splitting of the case will not affect the relative positions of the several operative parts of the instrument.

2. In a measuring instrument for measuring electrical currents, the combination of a case or support, a dial, a frame for the expansion wire, air chamber and bearings for the pointer supported from the case at a place of small area, an expansion wire and a pivoted pointer sustained thereby, the pointer having a piston for the air chamber, and a connection between the pointer and expansion wire, whereby warping, bending or splitting of the case will not affect the relative positions of the several operative parts of the instrument.

3. In a measuring instrument for measuring electrical currents, the combination of a case or support, a dial, a frame for the expansion wire and bearings for the pointer supported from the case at a place of small area, an expansion wire and a pivoted pointer sustained thereby, a spring to move the pointer against the action of the expansion wire, and a connection between the pointer and expansion wire, whereby warping, bending or splitting of the case will not affect the relative positions of the several operative parts of the instrument.

4. In a measuring instrument for measuring electrical currents, the combination of the case or support, a frame for the pointer and expansion wire having a connection of small area with the case or support, an expansion wire, a pointer, and a connection between the pointer and expansion wire.

5. In a measuring instrument for measuring electrical currents, the combination of the case or support, a frame for the pointer and expansion wire having a connection of small area with the case or support, an expansion wire, a pointer, a connection between the pointer and expansion wire, and a spring to pull the pointer away from the expansion wire.

6. In a measuring instrument for measuring electrical currents, the combination of the case or support, a frame for the pointer and expansion wire having a compensating construction and a connection of small area with the case or support, an expansion wire, a pointer, and a connection between the pointer and expansion wire.

7. In a measuring instrument for measuring electrical currents, the combination of the case or support, a frame for the pointer and expansion wire having a compensating construction and a connection of small area with the case or support, an expansion wire, a pointer, a connection between the pointer and expansion wire, and a spring to oppose the action of the expansion wire on the pointer also carried by the frame for the pointer and expansion wire.

8. In a measuring instrument for measuring electrical currents, the combination of a dial, a pointer therefor, a stretched expansion wire over which a current is made to pass, a compensating support for the wire and pointer having a small area of support, a connection between the pointer and expansion wire intermediate of its ends, and a spring to oppose the action of the wire upon the pointer.

9. In a measuring instrument for measuring electrical currents, the combination of a movable pointer having a piston, formed integral therewith with an air chamber in which the piston works to make the pointer dead-beat, and means actuated by the current to be measured to move the pointer.

10. In a measuring instrument for measuring electrical currents, the combination of a movable pointer having a piston, formed integral therewith with an air chamber in which the piston works to make the pointer dead-beat, and means actuated by the current to be measured consisting of an expansion wire connected with and adapted to move the pointer.

11. In a measuring instrument for measuring electrical currents, the combination of a dial, a pointer therefor, a stretched expansion wire over which a current is made to pass, a connection between the pointer and expansion wire intermediate of its ends, a spring to oppose the action part of which is stationary and part movable and integral with the pointer of the wire upon the pointer, and an air damper to cause the pointer to move with a dead-beat action.

12. In a measuring instrument for measuring electrical currents, the combination of a dial, a pointer therefor, a stretched expansion wire over which the current is made to pass, a compensating support for the wire, a connection between the pointer and expansion wire intermediate of its ends, a spring to oppose the action part of which is stationary and part movable and integral with the pointer of the wire upon the pointer, and an air damper to cause the pointer to move with a dead-beat action.

13. In a measuring instrument for measuring electrical currents, the combination of an expansion wire, a pointer actuated thereby, a compensating support for the expansion wire having its ends provided with means for holding the wire in tension, and an intermediate frame for sustaining the support in the air.

14. In a measuring instrument for measuring electrical currents, an expansion wire, a pointer moved thereby, a compensating support for the wire composed of a central frame and two oppositely projecting rods or bars, a connection between the end of one of the rods or bars and the expansion wire, an insulating support carried by the end of the other rod or bar, and a connection between the other end of the expansion wire and the insulating support.

15. In a measuring instrument for measuring electrical currents, an expansion wire, a pointer moved thereby, a compensating support for the wire composed of a central frame and two oppositely projecting rods or bars of different metals having different coefficients of expansion but such that the resultant expansion equals the coefficient of expansion of the expansion wire, a connection between one of the rods or bars and the expansion wire, an insulating support carried by the end of the other rod or bar, and a connection between the other end of the expansion wire and the insulating support.

16. In a measuring instrument for measuring electrical currents, the combination of an expansion wire, a pointer moved thereby, and a compensating support for the expansion wire consisting of two independent metal parts of different coefficients of expansion secured together mechanically but in which the resultant coefficient of expansion of the entire support is equal to the coefficient of expansion of the expansion wire.

17. In a measuring instrument for measuring electrical currents, the combination of an expansion wire, a pointer moved thereby, a support for the wire, an electrical connection between the support and one end of the wire, an insulator at the other end of the support, a connection between the insulator and the other end of the expansion wire, and two terminal posts one connected electrically with the support and the other with the end of the wire connected to the insulator.

18. In a measuring instrument for measuring electrical currents, the combination of an expansion wire, a pointer moved thereby, and a compensating support for the expansion wire consisting of two independent metal parts of different coefficients of expansion mechanically secured together and having a resultant coefficient of expansion equal to the coefficient of expansion of the expansion wire, and means to adjust the tension of the expansion wire while sustained in the support.

19. In a measuring instrument for measuring electrical currents, the combination of a case of wood or material liable to warp a pivoted pointer, a frame in which the pointer is pivoted secured to the case, an arm extending from said frame near the pivot of the pointer, and clear of the case and a dial secured to the free end of the arm, whereby the dial and pointer bearings always maintain the same relative positions and are not relatively affected by warping of the case.

20. In a measuring instrument for measuring electrical currents, the combination of a case or box having a movable cover, the meter proper in said box or case having a pointer moved by the expansion of a wire by heat, a resistance of exposed wire arranged in the cover connected in series with the expansion wire but so as to be considerably removed from the meter proper when in use, and flexible or movable connecting circuits between the meter proper and resistance.

21. In a measuring instrument for measuring electrical currents, a case having a fixed upper and removable lower or bottom portion, combined with terminal posts fixed to the fixed upper portion and having contacts, and a meter proper secured to the removable lower or bottom portion having spring contacts adapted to form connection with the contacts on the fixed upper portion when the parts are assembled, whereby the meter proper may be detachably connected with the terminal binding posts.

22. In a measuring instrument for measuring electrical currents, a case having fixed and removable portions, a glass plate for the dial and terminal binding posts secured to the fixed portion, and a meter proper secured to the removable portion, and spring contacts carried by said portions for automatically connecting the said binding posts in circuit with the meter proper upon assembling the parts.

23. In a measuring instrument for measuring electrical currents, the combination of a case or box having a hinged cover, a meter proper arranged in the box and embodying a pointer movable over a scale and an expansion wire connected with the pointer so as to move it under the application of heat due to the passage of a current through the expansion wire and a resistance arranged in the cover and connected in series with the expansion wire so as to control the current passing through the expansion wire and yet be greatly removed from it when the meter is in use and the lid opened.

In testimony of which invention I have hereunto set my hand.

ELMER G. WILLYOUNG.

Witnesses:
R. M. HUNTER,
GEO. W. REED.